US011094981B2

(12) United States Patent
Hwang et al.

(10) Patent No.: US 11,094,981 B2
(45) Date of Patent: Aug. 17, 2021

(54) POUCH-SHAPED BATTERY CASE FOR SECONDARY BATTERIES CAPABLE OF DISCHARGING GAS

(71) Applicant: LG Chem, Ltd., Seoul (KR)

(72) Inventors: Soo Ji Hwang, Daejeon (KR); Yong Su Choi, Daejeon (KR); Sang Hun Kim, Daejeon (KR); Hyung Kyun Yu, Daejeon (KR); Na Yoon Kim, Daejeon (KR); Min Hyeong Kang, Daejeon (KR); Yong Kim, Daejeon (KR)

(73) Assignee: LG Chem, Ltd.

( * ) Notice: Subject to any disclaimer, the term of this patent is extended or adjusted under 35 U.S.C. 154(b) by 83 days.

(21) Appl. No.: 16/495,615

(22) PCT Filed: Jul. 5, 2018

(86) PCT No.: PCT/KR2018/007618
§ 371 (c)(1),
(2) Date: Sep. 19, 2019

(87) PCT Pub. No.: WO2019/078449
PCT Pub. Date: Apr. 25, 2019

(65) Prior Publication Data
US 2020/0028128 A1 Jan. 23, 2020

(30) Foreign Application Priority Data
Oct. 17, 2017 (KR) .................. 10-2017-0134648

(51) Int. Cl.
*H01M 2/00* (2006.01)
*H01M 50/103* (2021.01)
(Continued)

(52) U.S. Cl.
CPC ....... *H01M 50/103* (2021.01); *H01M 50/126* (2021.01); *H01M 50/188* (2021.01); *H01M 50/197* (2021.01); *H01M 50/30* (2021.01)

(58) Field of Classification Search
CPC .. H01M 2/0212; H01M 2/0207; H01M 2/025; H01M 2/0277; H01M 2/0287;
(Continued)

(56) References Cited

U.S. PATENT DOCUMENTS 6,174,337 B1   1/2001   Keenan
8,071,231 B2   12/2011  Yang et al.
(Continued)

FOREIGN PATENT DOCUMENTS

JP   S5846824 A      3/1983
JP   2006179442 A    7/2006
(Continued)

OTHER PUBLICATIONS

Translation of PCT/ISA/237 (no date).*
(Continued)

*Primary Examiner* — Amanda C. Walke
(74) *Attorney, Agent, or Firm* — Lerner, David, Littenberg, Krumholz & Mentlik, LLP

(57) ABSTRACT

Disclosed herein is a pouch-shaped battery case, including an electrode assembly, an outer coating layer, a metal barrier layer, and an inner adhesive layer sequentially stacked with one another, a first adhesive layer interposed between the outer coating layer and the metal barrier layer, a second adhesive layer interposed between the metal barrier layer and the inner adhesive layer, an upper case and a lower case sealed to one another by thermal fusion at outer edges thereof, such that the electrode assembly is mounted between the upper case and the lower case, and a gas discharge member providing gas communication between
(Continued)

an inside and an outside of the pouch-shaped battery case, the gas discharge member being disposed within a fused portion of the pouch-shaped battery case that is formed by the inner adhesive layer of the upper case and the lower case being thermally fused to one another.

11 Claims, 3 Drawing Sheets

(51) Int. Cl.
*H01M 50/30* (2021.01)
*H01M 50/126* (2021.01)
*H01M 50/197* (2021.01)
*H01M 50/188* (2021.01)

(58) Field of Classification Search
CPC .. H01M 50/30; H01M 50/103; H01M 50/105; H01M 50/116; H01M 50/119; H01M 50/124; H01M 50/126; H01M 50/178; H01M 50/186; H01M 50/188; H01M 50/197

See application file for complete search history.

(56) References Cited

U.S. PATENT DOCUMENTS

| | | | |
|---|---|---|---|
| 8,956,743 B2 | 2/2015 | Yang et al. | |
| 9,166,217 B2 | 10/2015 | Ha | |
| 9,728,766 B2 | 8/2017 | Choi et al. | |
| 10,637,012 B2* | 4/2020 | Kim | H01M 50/124 |
| 2003/0232236 A1 | 12/2003 | Mitchell et al. | |
| 2006/0115717 A1* | 6/2006 | Schubert | H01M 4/08 |
| | | | 429/124 |
| 2007/0072071 A1* | 3/2007 | Lee | H01M 10/34 |
| | | | 429/162 |
| 2010/0239895 A1 | 9/2010 | Yang et al. | |
| 2012/0196161 A1 | 8/2012 | Yang et al. | |
| 2012/0231307 A1 | 9/2012 | Ha | |
| 2013/0209844 A1 | 8/2013 | Gless et al. | |
| 2015/0072185 A1 | 3/2015 | Cho et al. | |
| 2016/0020452 A1 | 1/2016 | Choi et al. | |
| 2016/0036024 A1 | 2/2016 | Choi et al. | |
| 2018/0114964 A1 | 4/2018 | Kim et al. | |
| 2018/0159112 A1* | 6/2018 | Chung | H01M 50/54 |
| 2018/0248235 A1 | 8/2018 | Kim et al. | |
| 2019/0229361 A1* | 7/2019 | Kim | H01M 50/543 |
| 2020/0295315 A1* | 9/2020 | Kim | H01M 50/531 |

FOREIGN PATENT DOCUMENTS

| | | |
|---|---|---|
| JP | 2008293992 A | 12/2008 |
| JP | 2010211927 A | 9/2010 |
| JP | 2010287451 A | 12/2010 |
| JP | 2013529831 A | 7/2013 |
| JP | 2014211994 A | 11/2014 |
| JP | 2017168355 A | 9/2017 |
| KR | 100900411 B1 | 6/2009 |
| KR | 20090060497 A | 6/2009 |
| KR | 20120050207 A | 5/2012 |
| KR | 20120103206 A | 9/2012 |
| KR | 20150055775 A | 5/2015 |
| KR | 20160010823 A | 1/2016 |
| KR | 20160014828 A | 2/2016 |
| KR | 20170027150 A | 3/2017 |
| KR | 20170043926 A | 4/2017 |
| KR | 20170068332 A | 6/2017 |
| KR | 20170068730 A | 6/2017 |
| KR | 20170103236 A | 9/2017 |
| KR | 20170108823 A | 9/2017 |
| WO | 2011160888 A1 | 12/2011 |

OTHER PUBLICATIONS

Extended European Search Report including Written Opinion for EP18868317.1 dated Jun. 5, 2020; 11 pages.
International Search Report for Application No. PCT/KR2018/007618, dated Oct. 17, 2018, pp. 1-2.
Third Party Observation for JP2019547491 issued May 24, 2021; 7 pages.
Third Party Observation for EP18868317.1 issued Jun. 11, 2021; 9 pages.
"Laminated Film Processing Technology," Chapter 3, "Manufacturing Method and Type of Packaging Film," published Apr. 12, 1990; 4 pages.

* cited by examiner

【FIG. 1】
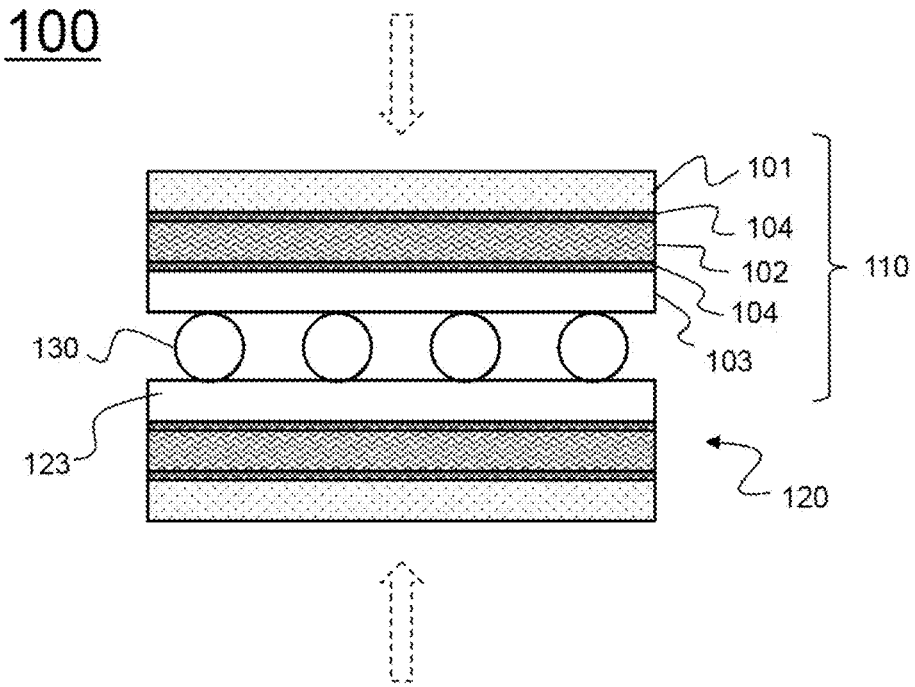
【FIG. 2】
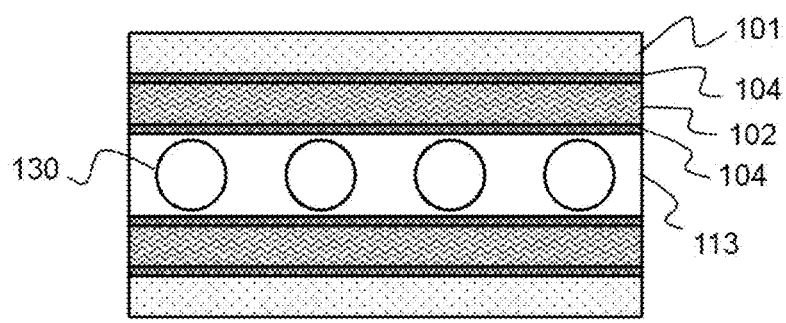

[FIG. 3]
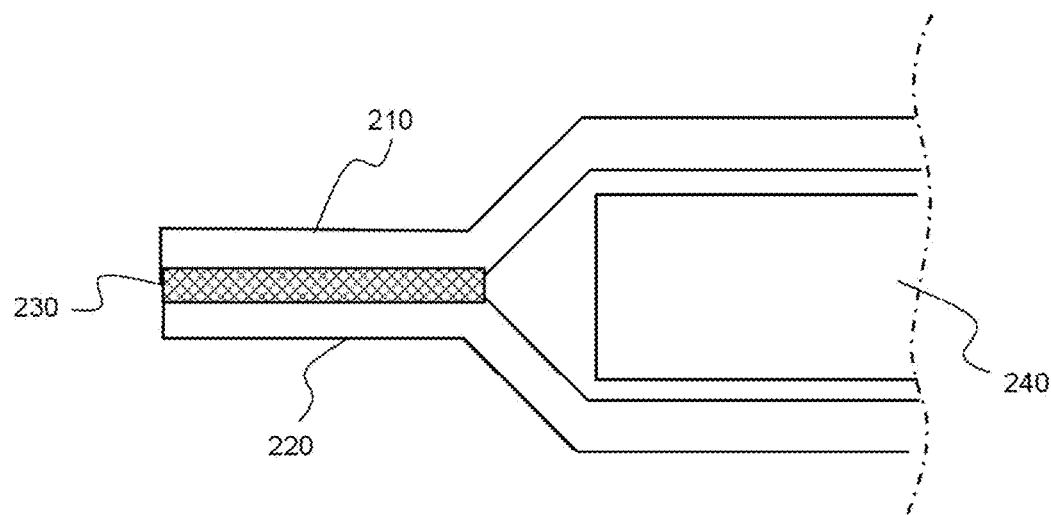

[FIG. 4]
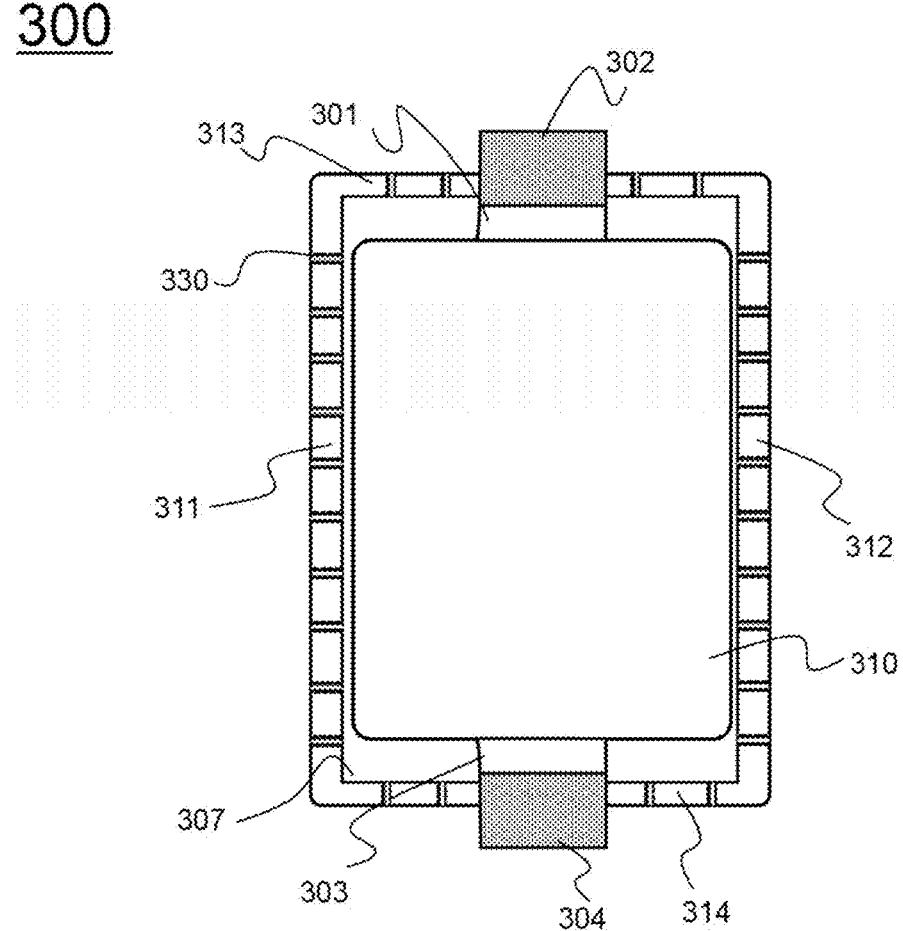

POUCH-SHAPED BATTERY CASE FOR SECONDARY BATTERIES CAPABLE OF DISCHARGING GAS

CROSS-REFERENCE TO RELATED APPLICATIONS

This application is a national phase entry under 35 U.S.C. § 371 of International Application No. PCT/KR2018/007618, filed on Jul. 5, 2018, which claims priority to Korean Patent Application No. 10-2017-0134648, filed on Oct. 17, 2017, the disclosures of which are hereby incorporated by reference herein in their entireties.

TECHNICAL FIELD

The present invention relates to a pouch-shaped battery case for secondary batteries that is capable of discharging gas, and more particularly to a pouch-shaped battery case for secondary batteries including a gas discharge member for allowing the inside and the outside of the pouch-shaped battery case to communicate with each other, which is disposed in a sealed portion formed as the result of thermal fusion of outer edges of an upper case and a lower case, in which an electrode assembly is mounted.

BACKGROUND ART

Secondary batteries, which can be charged and discharged, have attracted considerable attention as power sources for transportation means requiring high output and large capacity, including an electric vehicle (EV), a hybrid electric vehicle (HEV), and a plug-in hybrid electric vehicle (Plug-In HEV), which have been proposed as alternatives to gasoline and diesel vehicles.

The secondary batteries may be classified into a cylindrical battery, a prismatic battery, and a pouch-shaped battery based on the shape thereof. Among these batteries, the pouch-shaped battery, which can be stacked with high integration, has high energy density per unit weight, is inexpensive, and can be easily modified, has attracted considerable attention.

The pouch-shaped battery cell is a battery cell including a battery case made of a laminate sheet, in which an electrode assembly is mounted in the battery case.

One of the principal research projects for a pouch-shaped battery, the outer surface of which is generally soft, is to improve the safety of the pouch-shaped battery. A lithium secondary battery may explode due to high temperature and pressure in the secondary battery, which may be caused by an abnormal state of the secondary battery, such as a short circuit in the secondary battery, overcharge of the secondary battery with higher than an allowed current or voltage, exposure of the secondary battery to high temperatures, or deformation of the secondary battery due to being dropped or having an external impact applied thereto.

Furthermore, in the case in which the pressure in the pouch-shaped battery increases to a predetermined level due to the generation of a large amount of gas during the use of the pouch-shaped battery, a sealed portion of the pouch-shaped battery may be vented.

Various attempts have been made to prevent the sealed portion of the pouch-shaped battery from being vented due to an increase in the inner pressure of the pouch-shaped battery, i.e. to improve the safety of the pouch-shaped battery.

Korean Patent Application Publication No. 2012-0103206 discloses a secondary battery configured to have a structure in which a safety film is formed on an electrode tab such that when the temperature or the pressure in the battery increases, the safety film is melted in order to rapidly release the sealed state of a battery case.

The secondary battery disclosed in Korean Patent Application Publication No. 2012-0103206 is configured such that the battery is prevented from exploding or catching fire. However, the reuse of the battery is not possible.

Korean Patent Application Publication No. 2016-0014828 discloses a venting system including a venting device that is capable of adjusting the opening and closing of a path in order to discharge gas out of a pouch-shaped secondary battery. According to Korean Patent Application Publication No. 2016-0014828, gas can be discharged from the secondary battery, and the secondary battery can continue to be used. The venting device includes a gas discharge adjustment unit including a main body, a stopper member, and an elastic member. That is, additional complicated members are required in order to vent gas.

Korean Patent Application Publication No. 2017-0043926 discloses a secondary battery configured to have a structure in which a gas pocket for receiving gas generated in the battery is formed in a sealed portion of the battery as a non-fused region. Since the gas pocket is located in the sealed portion, however, gas generated in the battery cannot be completely discharged out of the battery.

Therefore, there is an urgent necessity for technology that is capable of discharging gas, generated during the use of a conventional pouch-shaped battery, out of the pouch-shaped battery while using the pouch-shaped battery in the same way as previously without deforming the external shape of the pouch-shaped battery, whereby the pouch-shaped battery can be used continuously.

DISCLOSURE

Technical Problem

The present invention has been made in view of the above problems and other technical problems that have yet to be resolved, and it is an object of the present invention to provide a pouch-shaped battery case including a gas discharge member disposed in a sealed portion formed as the result of an upper case and a lower case being thermally fused, the gas discharge member being configured to allow the inside and the outside of the pouch-shaped battery case to communicate with each other such that gas generated in a pouch-shaped battery during the use of the pouch-shaped battery can be discharged out of the pouch-shaped battery case through the gas discharge member.

Consequently, it is possible to prevent the sealed portion in the battery case from being damaged due to swelling of the battery case, which may be caused by gas generated in the pouch-shaped battery during the use of the pouch-shaped battery.

Technical Solution

In accordance with an aspect of the present invention, the above and other objects can be accomplished by the provision of a pouch-shaped battery case including an electrode assembly mounted within the pouch-shaped battery case, an outer coating layer, a metal barrier layer, and an inner adhesive layer sequentially stacked with one another, a first adhesive layer interposed between the outer coating layer and the metal barrier layer in order to increase a force of adhesion therebetween, a second adhesive layer interposed between the metal barrier layer and the inner adhesive layer in order to increase a force of adhesion therebetween, an upper case and a lower case sealed to one another by thermal fusion at outer edges thereof, such that the electrode assembly is mounted between the upper case and the lower case, and a gas discharge member providing gas communication between an inside and an outside of the pouch-shaped battery case, the gas discharge member being disposed within a fused portion of the pouch-shaped battery case that is formed by the inner adhesive layer of the upper case and the lower case being thermally fused to one another.

At least one of the upper case and the lower case may be provided with a concave unit for receiving the electrode assembly. After the electrode assembly is placed in the concave unit, the outer edges of the upper case and the lower case may be sealed by thermal fusion in the state in which the outer edges of the upper case and the lower case are located so as to face each other.

Gas, including carbon dioxide, is generated in a pouch-shaped battery as the result of a reaction between an electrode active material and an electrolytic solution during normal use of the pouch-shaped battery as well as in the case in which the pouch-shaped battery operates abnormally. In the case in which the pressure in the battery increases due to the gas generated in the battery, the outer edge of the battery case sealed by thermal fusion may be vented. In the case in which the pressure in the battery is high, the battery may even explode.

In the present invention, the gas discharge member is disposed in the sealed portion of the battery case such that the inside and the outside of the battery case communicate with each other via the gas discharge member. Consequently, gas generated in the battery may be discharged out of the battery through the gas discharge member.

In addition, the present invention is advantageous in that no additional device is required, but only the gas discharge member is provided in order to discharge gas out of the battery, whereby it is possible to reduce the pressure in the pouch-shaped battery without increasing the overall size of the pouch-shaped battery.

Furthermore, the gas discharge member is fixed in the sealed portion of the battery case only through sealing by thermal fusion in the state in which the gas discharge member is placed between the upper case and the lower case. Consequently, no additional process of fixing the gas discharge member is necessary.

In a concrete example, the gas discharge member may be configured to have a structure in which the gas discharge member is located in the sealed portion of the battery case for allowing the inside and the outside of the battery case to communicate with each other and in which the overall size and shape of the pouch-shaped battery case are not changed. For example, the gas discharge member may be an elongated pipe-shaped member.

The gas discharge member may be configured to have a porous structure having open type pores formed therein. Gas may be discharged out of the battery through the open type pores.

The inside and the outside of the battery case communicate with each other via the gas discharge member. In the case in which the pressure in the pouch-shaped battery increases due to the gas generated in the pouch-shaped battery, therefore, the gas may be discharged out of the pouch-shaped battery. Since the pressure in the pouch-shaped battery is high, foreign matter is prevented from being introduced into the battery. In addition, the pressure in the pouch-shaped battery is maintained equal to or higher than external pressure. Consequently, foreign matter is prevented from being introduced into the battery through the open type pores in the gas discharge member.

In a concrete example, the gas discharge member may include a metal oxide or a metal hydroxide as a gas adsorption material. It is possible to more rapidly remove gas from the battery due to the gas adsorption material.

In addition, a specific gas adsorption material that is capable of adsorbing a large amount of gas that is generated may be included in consideration of the kind of an electrode active material and an electrolytic solution that are used, whereby it is possible to selectively remove gas.

In consideration of the fact that the gas discharge member is an elongated pipe-shaped member and that the gas discharge member is located such that the inside and the outside of the battery case are able to communicate with each other, the gas discharge member may be oriented such that the longitudinal direction of the gas discharge member coincides with the direction in which the inside and the outside of the pouch-shaped battery case communicate with each other.

The gas discharge member is located in the sealed portion formed as the result of the upper case and the lower case being thermally fused. Consequently, the sealed portion is configured to surround the outer surface of the gas discharge member, whereby it is possible to stably fix the gas discharge member. Specifically, the gas discharge member may be located in the middles of the inner adhesive layer of the upper case and the inner adhesive layer of the lower case, which are thermally fused, in the vertical direction.

In consideration of the fact that the pressure in the battery is generally maintained higher than the pressure outside the battery even though the gas discharge member is located such that the inside and the outside of the battery case are able to communicate with each other, the possibility of foreign matter being introduced into the pouch-shaped battery case through the gas discharge member is very low. That is, the gas discharge member may prevent foreign matter from being introduced into the pouch-shaped battery case in the state in which the battery performs normal operation, and may discharge gas from the pouch-shaped battery case when the pressure in the battery increases.

The gas discharge member may be located in some of four outer edges of the battery case. In order to rapidly discharge gas from the battery, however, a plurality of individual gas discharge members may be disposed in sealed portions formed at the four outer edges of the battery case.

Consequently, the individual gas discharge members may be disposed in the entire sealed portions at predetermined intervals.

In order to prevent an increase in the overall thickness of the pouch-shaped battery case due to the gas discharge member, the thickness of the pipe-shaped gas discharge member may be smaller than the sum of the thickness of the inner adhesive layer of the upper case and the thickness of the inner adhesive layer of the lower case. For example, the thickness of the pipe-shaped gas discharge member may be 50% to 90% of the sum of the thickness of the inner adhesive layer of the upper case and the thickness of the inner adhesive layer of the lower case.

In the case in which the thickness of the pipe-shaped gas discharge member is smaller than 50% of the sum of the thicknesses of the inner adhesive layers, the path for discharging gas becomes narrow, whereby it is difficult to rapidly discharge gas from the battery, which is undesirable.

In the case in which the thickness of the pipe-shaped gas discharge member is larger than 90% of the sum of the thicknesses of the inner adhesive layers, the gas discharge member may not be stably fixed between the adhesive layers, which is also undesirable.

As described above, the gas discharge member according to the present invention is disposed in the sealed portion of the battery case without increasing the overall size of the battery case or deforming the shape of the battery case. Since the gas discharge member is fixed by thermal fusion in the state of being disposed in the sealed portion, no additional process of fixing the gas discharge member is necessary.

In accordance with other aspects of the present invention, there are provided a pouch-shaped battery cell including the pouch-shaped battery case and a battery pack including the pouch-shaped battery cell.

Specifically, the battery pack may be used as a power source for a device requiring the ability to withstand high temperatures, a long lifespan, high rate characteristics, and the like. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a vertical sectional view showing a sealed portion of a pouch-shaped battery case according to an embodiment of the present invention, in which a gas discharge member is disposed.

FIG. 2 is a vertical sectional view showing the state in which the sealed portion of the pouch-shaped battery case of FIG. 1 is thermally fused.

FIG. 3 is a vertical sectional view showing a portion of the pouch-shaped battery case of FIG. 2.

FIG. 4 is a plan view showing a pouch-shaped battery according to an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is a vertical sectional view showing a sealed portion of a pouch-shaped battery case according to an embodiment of the present invention, and FIG. 2 is a vertical sectional view schematically showing the state in which the sealed portion of the pouch-shaped battery case of FIG. 1 is thermally fused.

Referring to FIGS. 1 and 2, a pouch-shaped battery case 100 includes an upper case 110 and a lower case 120. The upper case 110 and the lower case 120 are configured to have the same structure. Specifically, the upper case 110 is configured to have a structure in which an outer coating layer 101, a metal barrier layer 102, and an inner adhesive layer 103 are sequentially stacked from the outside in the inward direction, in which an adhesive layer 104 is interposed between the outer coating layer 101 and the metal barrier layer 102 in order to increase the force of adhesion therebetween, and in which an adhesive layer 104 is also interposed between the metal barrier layer 102 and the inner adhesive layer 103 in order to increase the force of adhesion therebetween.

Between the inner adhesive layer 103 of the upper case 110 and an inner adhesive layer 123 of the lower case 120 is disposed an elongated pipe-shaped gas discharge member 130 so as to extend through the inside and the outside of the battery case.

In the case in which heat and pressure are applied to the upper surface and the lower surface of the pouch-shaped battery case 100 in directions indicated by arrows, the inner adhesive layers of the upper case and the lower case are melted to form a single adhesive layer 113, as shown in FIG. 2. As a result, the outer surface of the gas discharge member 130 may be surrounded by the adhesive layer 113, whereby the gas discharge member 130 may be fixed. The diameter of the gas discharge member 130 may be 50% to 90% of the height of the adhesive layer 113. The gas discharge member 130 may be located in the middle of the adhesive layer 113 in the vertical direction.

FIG. 3 is a vertical sectional view schematically showing a portion of the pouch-shaped battery case of FIG. 2.

Referring to FIG. 3, an electrode assembly 240, configured to have a structure in which a separator is interposed between a positive electrode and a negative electrode, is mounted in a battery case including an upper case 210 and a lower case 220. The outer edges of the upper case 210 and the lower case 220 are sealed by thermal fusion.

A gas discharge member 230 is disposed in a sealed portion formed as the result of an inner adhesive layer of the upper case 210 and an inner adhesive layer of the lower case 220 being melted. The inside and the outside of the battery case communicate with each other via the gas discharge member 230, whereby gas may be discharged from a battery through the gas discharge member 230.

A single gas discharge member 230 is shown. Alternatively, a plurality of gas discharge members may be interposed between the inner adhesive layers of the upper and lower cases in the vertical direction.

FIG. 4 is a plan view schematically showing a pouch-shaped battery according to an embodiment of the present invention.

Referring to FIG. 4, a pouch-shaped battery 300 includes a battery case having formed therein a concave unit 307 for receiving an electrode assembly 310, to which a positive electrode tab 301 and a negative electrode tab 303, which protrude in different directions, are attached. A positive electrode lead 302 connected to the positive electrode tab 301 and a negative electrode lead 304 connected to the negative electrode tab 303 extend out of the battery case.

Individual gas discharge members 330 are disposed in a left sealed portion 311, a right sealed portion 312, an upper sealed portion 313, and a lower sealed portion 314 of the battery case when viewed in a plan view. The individual gas discharge members 330 are disposed at equal intervals. Alternatively, the individual gas discharge members 330 are disposed at different intervals. As another alternative, the individual gas discharge members may be disposed in the middle of the battery case in the longitudinal direction at smaller intervals in consideration of the fact that the middle of the battery case in the longitudinal direction swells more than the remaining portions of the battery case.

Of course, the individual gas discharge members may be disposed in only one of the sealed portions, or may be disposed in only two or three sealed portions selected from among the four seals portions.

Those skilled in the art to which the present invention pertains will appreciate that various applications and modifications are possible based on the above description, without departing from the scope of the present invention.

INDUSTRIAL APPLICABILITY

As is apparent from the above description, the pouch-shaped battery case according to the present invention includes an upper case and a lower case, the outer edges of which are sealed by thermal fusion in the state in which an electrode assembly is mounted therein, wherein a gas discharge member for allowing the inside and the outside of the battery case to communicate with each other is disposed in a sealed portion formed as the result of the upper case and the lower case being sealed, whereby it is possible to discharge gas from a battery through the gas discharge member.

In addition, since the gas discharge member is located in the sealed portion of the battery case, the overall size and/or shape of a pouch-shaped battery are not changed, and since the gas discharge member can be disposed in the sealed portion of the battery case in the process of manufacturing the pouch-shaped battery, it is not necessary to perform an additional process of installing the gas discharge member.

Furthermore, in the case in which the pressure in the pouch-shaped battery increases during the use of the pouch-shaped battery, gas is discharged from the pouch-shaped battery, and in the case in which the pressure in the pouch-shaped battery decreases during the use of the pouch-shaped battery, gas is prevented from being discharged from the pouch-shaped battery, which are performed repeatedly. Consequently, it is possible to continuously use the battery.

The invention claimed is:

1. A pouch-shaped battery case, comprising:
an electrode assembly mounted within the pouch-shaped battery case;
an outer coating layer, a metal barrier layer, and an inner adhesive layer sequentially stacked with one another;
a first adhesive layer interposed between the outer coating layer and the metal barrier layer in order to increase a force of adhesion therebetween;
a second adhesive layer interposed between the metal barrier layer and the inner adhesive layer in order to increase a force of adhesion therebetween;
an upper case and a lower case sealed to one another by thermal fusion at outer edges thereof, such that the electrode assembly is mounted between the upper case and the lower case; and
a gas discharge member providing gas communication between an inside and an outside of the pouch-shaped battery case, the gas discharge member being disposed within a fused portion of the pouch-shaped battery case that is formed as by the inner adhesive layer of the upper case and the lower case being thermally fused to one another.

2. The pouch-shaped battery case according to claim 1, wherein the gas discharge member is an elongated pipe-shaped member.

3. The pouch-shaped battery case according to claim 2, wherein the gas discharge member has open pores formed therein.

4. The pouch-shaped battery case according to claim 1, wherein the gas discharge member includes a gas adsorption material.

5. The pouch-shaped battery case according to claim 2, wherein a longitudinal direction of the gas discharge member coincides with an outward direction extending through the fused portion of the pouch-shaped battery case from the inside to the outside of the pouch-shaped battery case.

6. The pouch-shaped battery case according to claim 1, wherein the gas discharge member is located in a middle part, in a vertical direction, of the fused portion of the pouch-shaped battery case that is formed by the inner adhesive layer of the upper case and the inner adhesive layer of the lower case.

7. The pouch-shaped battery case according to claim 1, wherein the gas discharge member is configured to prevents foreign matter from being introduced into the pouch-shaped battery case during normal operation of the electrode assembly, and the gas discharge member is configured to discharges gas from the pouch-shaped battery case when an inner pressure within the pouch-shaped battery case reaches or exceeds a predetermined pressure.

8. The pouch-shaped battery case according to claim 1, wherein the gas discharge member comprises a plurality of individual gas discharge members disposed at predetermined intervals throughout an entirety of the fused portion of the pouch-shaped battery case.

9. The pouch-shaped battery case according to claim 2, wherein a thickness of the pipe-shaped gas discharge member is smaller than a thickness of the fused portion of the pouch-shaped battery case.

10. The pouch-shaped battery case according to claim 1, wherein the gas discharge member thermally fused within the fused portion of the pouch-shaped battery case.

11. A pouch-shaped battery cell comprising the pouch-shaped battery case according to claim 1.

* * * * *